April 9, 1968  M. R. L. THURNER  3,376,658

GROUND-BASED AIRCRAFT FLIGHT SIMULATING APPARATUS

Filed March 17, 1966  4 Sheets-Sheet 1

April 9, 1968     M. R. L. THURNER     3,376,658

GROUND-BASED AIRCRAFT FLIGHT SIMULATING APPARATUS

Filed March 17, 1966     4 Sheets-Sheet 4

INVENTOR
MICHAEL R. L. THURNER

BY Larsen and Taylor
ATTORNEYS

United States Patent Office 3,376,658
Patented Apr. 9, 1968

3,376,658
GROUND-BASED AIRCRAFT FLIGHT
SIMULATING APPARATUS
Michael Richard Louis Thurner, Horsham, Sussex,
England, assignor to Communications Patents
Limited
Filed Mar. 17, 1966, Ser. No. 535,103
Claims priority, application Great Britain, May 3, 1965,
18,562/65
8 Claims. (Cl. 35—12)

ABSTRACT OF THE DISCLOSURE

A ground-based flight simulating apparatus for simulating effects due to the stalling of the blades of the main rotor of a helicopter. Blade angle of attack is computed at one azimuth angle of the rotor disc and the effects of blade stall are then introduced as functions of this angle. These effects are provided by signals which are fed to the computer to cause a reduction in the lift produced by the rotor and also to cause the aircraft to roll towards the stalled side of the rotor disc and to pitch nose upwards, with increasing blade angle of attack, when a critical value of angle of attack is exceeded. At the same time a simulated rotor-induced vibration of the fuselage is produced.

This invention relates to ground-based aircraft flight simulating apparatus for simulating helicopter flight, and in particular to a system for simulating effects due to stalling of the blades of the main rotor of a helicopter.

The altitude, attitude and direction of flight of a helicopter is controlled by varying the pitch of the blades of the main and tail rotors. The pitch of the blades of the main rotor determines the lift and drag produced by the main rotor and the flapping and in-plane blade motions about the blade hinges. The resultant main rotor force, absorbed torque and orientation, and the tail rotor force, give rise to forces and moments on the helicopter fuselage which determine the fuselage motions.

In a flight simulator, signals corresponding to settings of flight and engine controls, located in a pilot's compartment, are fed to a computer, outputs of which are supplied to instruments for indicating, to the pilot, the responses of the aircraft when operated under conditions set up at an Instructor's station. In order to achieve faithful simulation in a flight simulator for a helicopter, it is necessary to compute rotor performance in a manner which takes into account the dynamics of the main rotor, since this affects both control and stability of a helicopter.

The performance of the main rotor of a helicopter may be determined, using a computing system in which a blade is considered to be composed of a number of blade elements, the net rotor forces and moments being represented by the sum, over the whole rotor disc, of increments due to the several blade elements. In this form of computing system, the elemental contributions are evaluated at many points in the rotor disc, using, for example, eighteen parallel computing channels. The contributions are summed in a plurality of summing devices to yield the net forces and moments.

It is possible, by making certain assumptions, to simplify the equations concerned with the elemental contributions, to enable these contributions to be integrated over the rotor disc, so that a composite equation for the whole rotor contribution may be derived therefrom. The computation is thereby simplified, with consequent saving of space and cost of analogue computing apparatus.

The least valid of the simplifying assumptions which can be made are that aerodynamic lift is given by a curve of constant slope and that profile drag coefficient is a constant. Theoretical investigation of the properties of a lifting rotor reveals that both lift slope and profile drag coefficient are functions of angle of attack and Mach number. One important effect of this is stalling of the main rotor due to a change of lift slope at high angles of attack of a rotor blade section.

It is an object of the present invention to provide a simplified computing system for simulating effects due to stalling of the blades of the main rotor of a helicopter.

Accordingly, the present invention provides ground-based aircraft flight simulating apparatus for simulating helicopter flight, including computing means for computing blade angle of attack of an element of a rotor blade of a helicopter, at one azimuth angle of the rotor disc, from electrical signals representing blade pitch angle and normal and tangential airflow velocities with respect to the said azimuth angle and means for providing at least one output from the said computing means which is a function of the computed blade angle of attack, whereby the effects due to stalling of the blades of the main rotor of a helicopter may be simulated.

In order that the invention may be readily carried into effect, an embodiment thereof will now be described in detail, by way of example, with reference to the accompanying drawings, in which.

Figure 3:
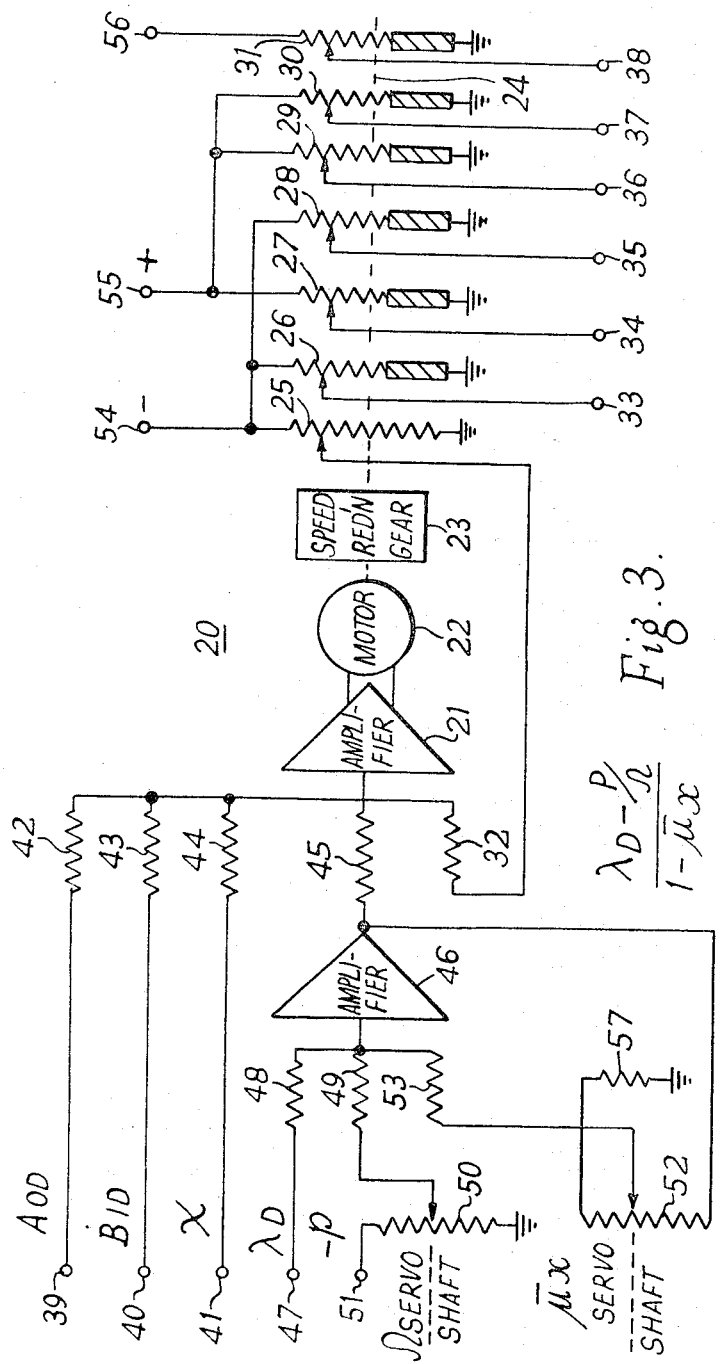
Figure 4:
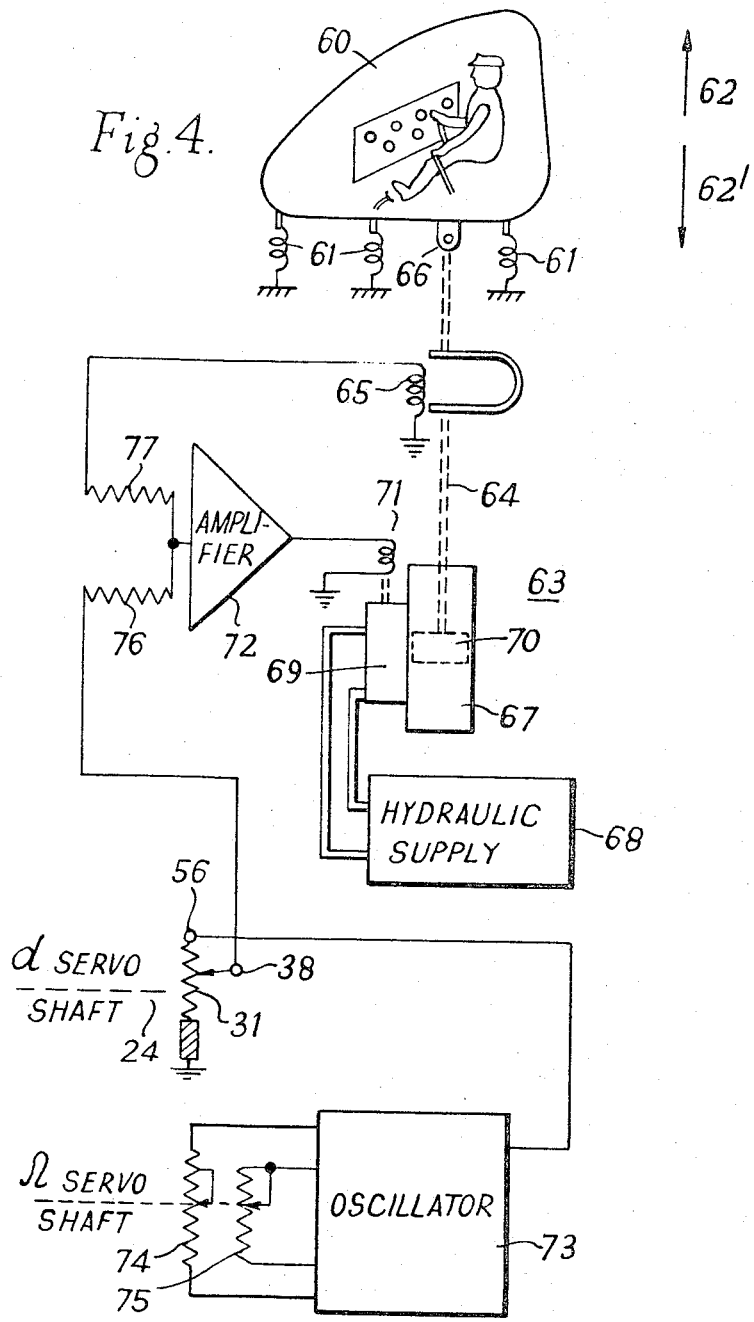
Figure 5:
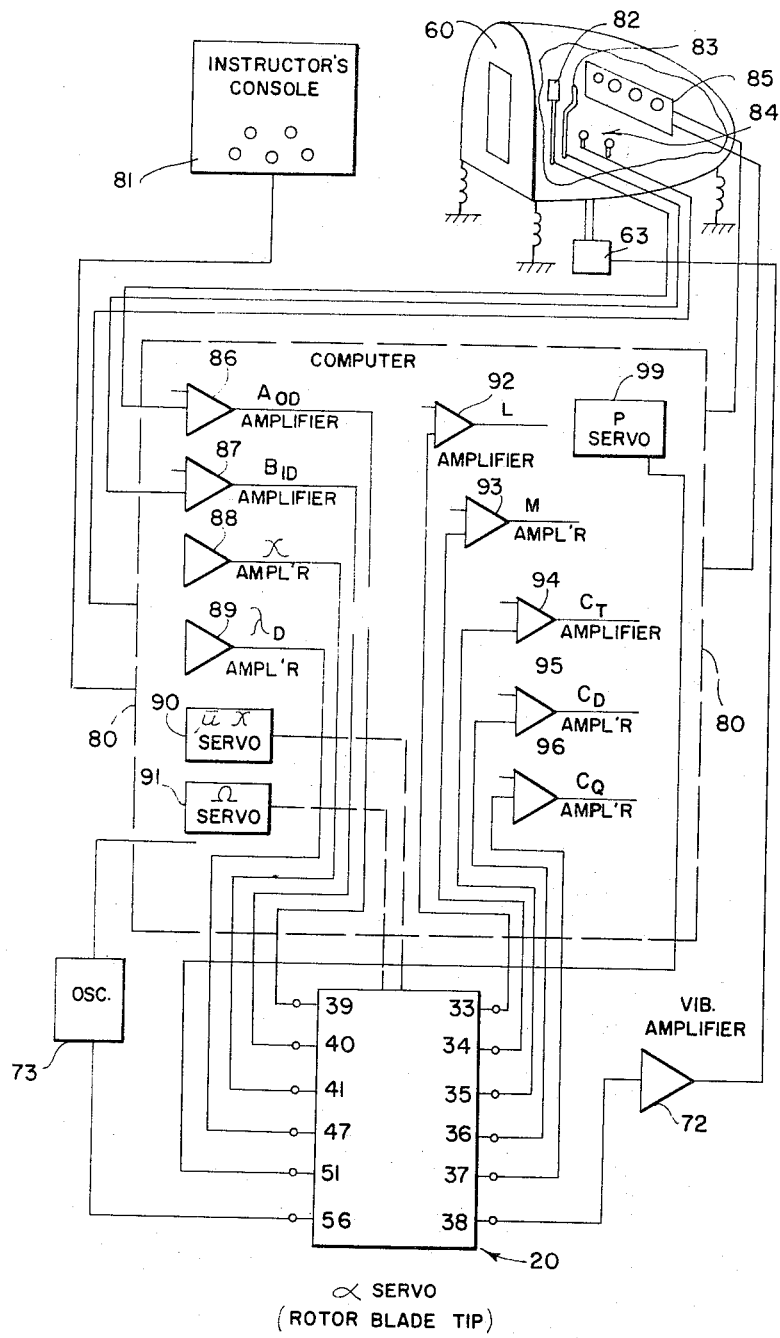

FIG. 3 is a schematic diagram of a system, according to the present invention, for simulating effects due to stalling of the rotor; and FIG. 4 is a schematic diagram of an arrangement for providing vibration of a pilot's compartment due to stalling of the rotor; and FIG. 5 is a schematic diagram of a helicopter flight simulator incorporating apparatus according to the present invention for simulating effects due to stalling of the rotor.

The principal effects of stalling of the main rotor of a helicopter are a rotor induced vibration of the fuselage and loss of flying control, if the stalling conditions are not corrected.

Figure 1:
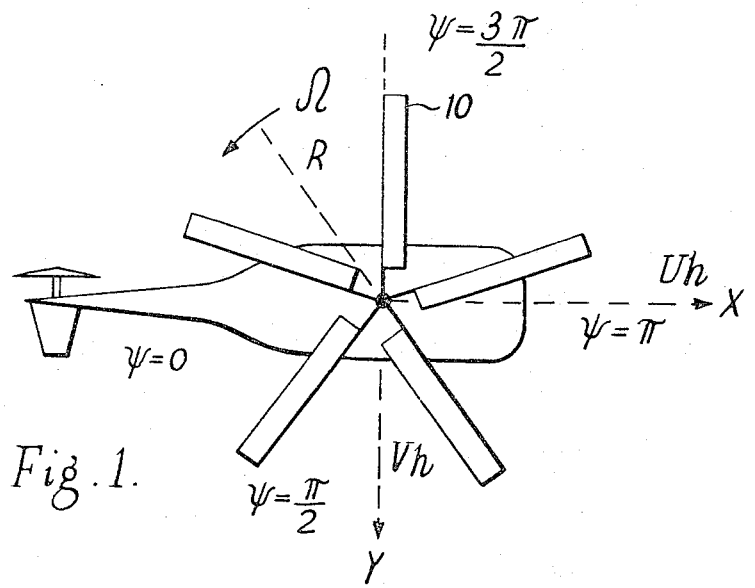
FIG. 1 shows, in diagrammatic form, a plan view of a helicopter in which aircraft forward and lateral axes and rotor azimuth angles are indicated.

The part of the rotor of a helicopter to stall first, is the tip of each retreating blade, at a position in each revolution where the blade passes over the Y axis of the aircraft, see FIG. 1.

The relative airflow at this point is the tangential speed of the rotating blade tip, less the forward speed of the helicopter. At high forward speeds, the relative airflow velocity diminishes to a value where, in order to maintain lift, the blade angle of attack becomes so high that the tip stalls. The passage of each blade, in turn, over the lateral axis of the aircraft produces vibration of the fuselage, at a frequency corresponding to that of the speed of the rotor multiplied by the number of rotor blades. This vibration is the primary indication to the pilot of the onset of blade stall. As the stall is penetrated by further increasing forward speed, the vibration increases in amplitude, and in a single rotor helicopter may eventually lead to an uncontrollable tendency for the aircraft to roll towards the stalled side of the rotor disc and to pitch to a nose-up position.

In order to simulate these effects fully, using the computing system first referred to earlier in the specification, the blade angle of each element of the rotor disc is computed and from these angles, the lift and drag coefficients of each element are determined.

A complete summation over the rotor disc, in real time, using these coefficients, is then carried out to obtain the vibratory and steady forces and moments transmitted through the hub to the helicopter fuselage.

In a computing system according to the present invention, blade angle of attack is computed at one azimuth angle of the rotor disc and the effects of blade stall are then introduced as functions of this angle. Blade angle of attack is computed from signals representing blade pitch angle and normal and tangential airflow velocities.

Figure 2:
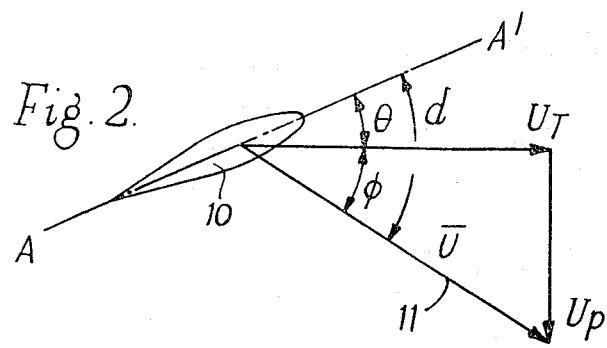
FIG. 2 shows, in diagrammatic form, an end view of a helicopter main rotor blade and normal and tangential airflow vectors associated therewith.

Before describing in detail the computing system of the present invention, the manner in which the input signals fed to the computing system are derived will be considered with references to FIGS. 1 and 2.

The chord line A–A′, of a cross-section of the tip of a rotor blade 10, of radius R, makes an angle $\alpha$ with a vector 11, representing a relative airflow of speed $\overline{U}$. The blade tip is assumed to be at that part in a revolution where the azimuth angle of the rotor blade is $3\pi/2$ radians, measured in the direction of rotation from the negative or X axis of the aircraft.

The vector 11 is the vector sum of vectors $U_p$ and $U_T$, corresponding to the blade tip normal velocity and to the blade tip tangential velocity respectively. Angle $\theta$, the blade geometric pitch angle, is the angle formed by the chord line A–A′ and the vector $U_T$. Angle $\alpha$, the angle of attack of the blade tip, is the sum of angles $\phi$ and $\theta$.

It will be seen from the Appendix, which follows at the end of the body of this specification, that the blade tip angle of attack $\alpha$ is given by the expression:

$$\alpha = A_{0D} + B_{1D} + \chi + \frac{\lambda_D - \frac{p}{\Omega}}{1 - \overline{\mu}_x} \qquad (10)$$

All of the terms of this expression are available in the computer of a conventional helicopter simulator, either as electrical signals or as angular shaft displacements, the magnitudes or displacements of which correspond to the magnitudes of the particular term.

The signals corresponding to the terms $A_{0D}$, $B_{1D}$ and $\chi$, representing blade collective pitch angle, lateral amplitude of cyclic pitch angle and pitch angle due to blade twist, respectively, are provided by amplifiers having inputs which are dependent upon settings of the pilot's collective and cyclic pitch controls. The signal corresponding to the term $\lambda_D$, representing the rotor disc inflow ratio, is derived from an amplifier forming a part of the system for computing rotor performance. In this system, rotor torque, thrust, forward force and side force are computed from rotational speed of the rotor, collective pitch and cyclic pitch control settings in the pilot's compartment, and computed components of total velocity. Hub velocities along the X, Y and Z axes and rotor thrust, drag and torque coefficients corresponding to the term $C_T$, $C_D$ and $C_Q$, respectively, are signals provided by computing amplifiers of the system. Servos, also forming part of this system, provide output shaft displacements corresponding to the terms $\overline{\mu}_x$ and $\Omega$, representing hub forward velocity ratio and rotor rotational speed respectively. As will be seen from the Appendix, velocity ratios are employed in order to simplify computing.

The signal corresponding to the term $p$, representing aircraft rate of roll, is derived from an integrator forming part of the flight computing system of the simulator, in which simulated roll, pitch and yaw attitude angles are derived by successive integrations of rolling, pitching and yawing moment signal inputs, corresponding to the terms L, M and N respectively.

Referring to FIG. 3, the computed blade angle of attack is provided as a shaft displacement, by a position servo, shown generally at 20, comprising a servo amplifier 21, a motor 22, a speed reduction gear 23 and potentiometers 25 to 31, the wipers of which are coupled to an output shaft 24 of the speed reduction gear 23. Stabilising velocity feedback, not shown in the drawing, may be incorporated, if desired. The wiper of the potentiometer 25 is connected to an input resistor 32 of the servo amplifier 21 and provides position feedback. The wipers of potentiometers 26 to 31 are connected to terminals 33 to 38 respectively and provide signals for producing the desired effects due to stalling of the rotor, in a manner which will be described in detail later in the specification. The winding of potentiometer 25 is connected to ground and to the negative pole of a source of supply of direct current, not shown in the drawing, connected to terminal 54.

The input signals corresponding to terms $A_{0D}$, $-B_{1D}$ and $\chi$ of appropriate polarity, obtained from the computer of the simulator, are fed to input terminals 39, 40 and 41 respectively and thence to the input of servo amplifier 21, by way of summing resistors 42, 43 and 44 respectively.

An input signal corresponding to the terms enclosed in the brackets, provided by a computing amplifier 46, is fed to the input of the servo amplifier 21 by way of a summing resistor 45. Input signals of appropriate polarity, corresponding to the terms $\lambda_D$ and $-p$, are fed to the input of the computing amplifier 46 by way of summing resistors 48 and 49 respectively. The input signal corresponding to the term $\lambda_D$ is fed to a terminal 47, which is connected to the summing resistor 48. The input signal corresponding to the term $-p/\Omega$ is obtained from the wiper of a potentiometer 50, connected to the summing resistor 49. The winding of the potentiometer 50 is connected to a terminal 51 and is fed with a signal, of appropriate polarity, corresponding to the term $-p$. The wiper of potentiometer 50 is mechanically coupled to the shaft of the $\Omega$ servo, located in the computer of the simulator To provide the complete expression within the brackets, the output of the computing amplifier 46 is connected to the winding of the potentiometer 52, the wiper of which is connected to provide a feedback signal to the input of the amplifier 46, by way of summing resistor 53. The wiper of the potentiometer 52 is mechanically coupled to the shaft of the $\overline{\mu}_x$ servo, located in the computer of the simulator. The winding of the potentiometer 52 is contoured and is connected by way of a resistor 57 to ground and to the output of the computing amplifier 46, so that the gain of the computing amplifier 46 is varied in a manner to provide a signal corresponding to the expression within the brackets, $$\left( \frac{\lambda_D - \frac{p}{\Omega}}{1 - \overline{\mu}_x} \right)$$

The values of the input summing resistors of the amplifiers 46 and 23 are such that the individual inputs have the required relationship to satisfy Equation 10.

The potentiometers 26 to 31 each have a part of the winding shorted out, indicated by cross-hatching in the drawing, and connected to ground. Hence, output signals are provided by these potentiometers only at positions of th shaft 24 where the angle $\alpha$ exceeds a value at which the effects of blade stalling become apparent, according to the characteristics of the aircraft simulated.

The winding of potentiometer 26 is connected to ground and to the terminal 54. The winding of the potentiometer 27 is connected to ground and to the positive pole of a source of supply of direct current, not shown in the diagram, connected to terminal 55. The wipers of the potentiometers 26 and 27, connected to terminals 33 and 34, provide additional rolling and pitching moment signals L and M respectively, to the inputs of the roll and pitch angle computing systems of the simulator, when the critical value of $\alpha$ is exceeded, to cause the aircraft to roll toward the stalled side of the rotor disc, the left hand side down, in this example, and to pitch nose upwards, as the blade angle of attack increases.

The winding of potentiometer 28 is connected to ground and to terminal 54. The wiper provides an additional rotor thrust coefficient signal $C_T$ to terminal 35, when the critical value of $\alpha$ is exceeded, to cause a reduction in the lift produced by the rotor, as the blade angle of attack increases.

The windings of potentiometers 29 and 30 are connected to ground and to terminal 55. The wipers of potentiometers 29 and 30, connected to terminals 36 and 37, provide additional rotor drag and rotor torque coefficient signals $C_D$ and $C_Q$ respectively, when the critical value of $\alpha$ is exceeded, to cause both rotor drag and rotor torque to increase with increasing blade angle of attack.

The winding of potentiometer 31 is connected to ground and is fed with an A.C. signal having a frequency corresponding to that with which the blades pass a given point in the rotor disc.

The wiper of poteniometer 31 is connected to terminal 38 and provides a signal when the critical value of $\alpha$ is exceeded, whose amplitude increases with increasing blade angle of attack.

Referring to FIG. 4, the pilot's compartment 60, containing controls and instruments corresponding to those of the aircraft simulated, is mounted on resilient supports 61, so as to be free to vibrate in upwards and downwards directions as indicated by the arrows 62 and 62'.

Vibrations are imparted to the pilot's compartment 60 by a force generator, shown generally by the reference 63, the output shaft 64 of which is mechanically coupled to the pilot's compartment by way of a force transducer 65 and a coupling 66. The force generator 63 comprises an hydraulic ram 67, fed with fluid from a source of supply of fluid 68, by way of an electrically operated control valve 69. The output shaft 64 is mechanically coupled to a piston 70 within the cylinder of the ram. The control valve 69 is operated by the armature of a solenoid 71 fed with oscillations provided by an amplifier 72. As the valve is displaced to and fro under the influence of the oscillations fed to the solenoid 71, fluid pressure is developed alternately on the front and rear faces of the piston 70, to cause the pilot's compartment to vibrate correspondingly. The frequency and amplitude of the vibration is determined by the frequency and amplitude respectively, of the oscillation fed to the input of the amplifier 72.

A force generator, similar to the force generator 63, is disclosed in British Patent No. 932,684.

As already described, an A.C. signal of a frequency corresponding to that of the frequency of passage past a given point of the blades of the main rotor and of variable amplitude which is a function of blade angle of attack, is fed to the winding of potentiometer 31 from terminal 56. The A.C. signal fed to terminal 56 is generated in a oscillator 73 of the Wien-bridge type. Essentially the oscillator 73 is an amplifier having a differential input with the output fed back to the input through a Wien-bridge circuit which allows regeneration at only one frequency. The frequency of the generated oscillations is determined by the values of variable resistors 74 and 75 which are included in the arms of the Wien-bridge.

The wipers of the variable resistors 74 and 75 are mechanically coupled to the output shaft of the $\Omega$ servo, so that the frequency of the oscillation, which is a multiple of rotor speed, is varied correspondingly.

An example of an oscillator of this kind is described in sect. 4.5 of "Waveforms," vol. 19 of the M.I.T. series, published by McGraw Hill, 1949.

The oscillation of controlled frequency and amplitude is fed from terminal 38 to the input of the amplifier 72 by way of a summing resistor 76. Feedback, provided by the force transducer 65, is fed to the input of the amplifier 72 by way of a summing resistor 77 to stabilise the amplitude of vibration of the pilot's compartment to the desired value corresponding to a given input signal amplitude fed to the input resistor 76.

In FIG. 5, the position servo 20, its input and output terminals, the pilot's compartment 60, the force generator 63, the amplifier 72 and the oscillator 73 are indicated by the same reference numbers as in FIGS. 3 and 4.

Referring to FIG. 5, the apparatus of the invention is used in conjunction with a helicopter flight simulator comprising the pilot's compartment 60, in which controls and instruments are provided which are representative of the controls and instruments of the simulated aircraft, a computer 80, by which the instruments are actuated, so as to indicate simulated conditions of flight and engine operation, as determined by operation of the controls, and an instructor's console 81, from which the computed conditions are controlled. In the drawing, part of the fuselage of the pilot's compartment has been broken away to show the collective and cyclic pitch controls, the rudder pedals, and flight and engine instruments, which are indicated by the reference numbers 82, 83, 84 and 85. respectively.

Vibrations are imparted to the pilot's compartment by the force generator 63 in the manner described with reference to FIG. 4.

The input terminals 39, 40, 41, 47 and 51 of the position servo 20 are fed with the input signals $A_{OD}$, $B_{ID}$, $\chi$ and $\lambda_D$, which are derived from the amplifiers 86, 87, 88 and 89 respectively and with the input signal $-p$ from a servo 99. Servo units 90 and 91 provide the shaft outputs $\mu X$ and $\Omega$ respectively, to shafts 97 and 98 respectively of the servo 20. An output signal from the oscillator 73 is fed to the input terminal 56 of the servo 20.

The additional rolling and pitching moment signals $-L$ and $M$, provided from the output terminals 33 and 34, are each fed to an input of amplifiers 92 and 93 respectively. The additional rotor thrust, drag and torque signals $-G_T$, $C_D$ and $C_Q$, provided from the output terminals 35, 36 and 37, are each fed to an input of amplifiers 94, 95 and 96 respectivcely. These signals produce loss of flying control, as already explained, if conditions leading to stalling of the rotor are not corrected.

The amplifiers 86 to 89 and 94 to 96, and the servos 90 and 91 form part of the rotor performance computing system of the computer 80. The amplifiers 92 and 93 and the servo 99 form part of the fuselage aerodynamics computing system of the computer 80.

The A.C. signal from the terminal 38, which is derived from the oscillator 73 by way of the potentiometer 31, FIG. 3, is fed to the input resistor 76, FIG. 4, of the amplifier 72, so that vibration of the fuselage is provided by the force transducer 63, when the critical value of blade angle of attack is exceeded. As already explained, a frequency of vibration of the fuselage is produced corresponding to that of the rotational speed of the rotor, so that a rotor induced vibration of the fuselage of a helicopter is simulated, if conditions leading to the stalling of the rotor are not corrected.

The design and development problems associated with the construction of a Helicopter Operational Flight Trainer are described in a paper by Eugene W. Cairns, published in the July 1959 issue of the Institute of Radio Engineers Transactions on Military Electronics. The computing system referred to in the paper is of the kind first referred to in this specification.

Details of the principles of operation of computing systems, by which the performance of a helicopter may be simulated, and of computing elements for use in such systems are described by Ringham and Cutler in a paper entitled "Flight Simulators," published in the Journal of the Royal Aeronautical Society, vol. 58, No. 519, March 1954.

*Appendix*

Blade geometric pitch angle $\theta$:

$$\theta = A_{OD} - A_{ID} \cos \psi - B_{ID} \sin \psi + \chi \qquad (1)$$

where:

$A_{OD}$=blade corrective pitch angle, measured with respect to rotor disc plane.
$A_{ID}$=longitudinal amplitude of cyclic pitch angle, measured with respect to rotor disc plane axis $Y_D$,
$B_{ID}$=lateral amplitude of cyclic pitch angle, measured with respect to rotor disc plane axis $X_D$,
$\chi$=pitch angle due to blade twist
$\psi$=blade azimuth angle Let the rotor blade be in a position in a revolution where $\psi=3\pi/2$ radians, then $\cos \psi=0$ and $\sin \psi=-1$ (FIG. 1)

$$\theta = A_{OD} + B_{ID} + \chi \qquad (2)$$

The derivation of Equation 1 is explained in "Aerodynamics of the Helicopter" by Alfred Jessow and Garry C. Myers, Jr., published by Macmillan & Co., New York, in 1952.

A simplified form of Equation 20a, chapter 7, $$\theta = A_0 - A_1 \cos \psi - B_1 \sin \psi - A_2 \cos 2\psi - B_2 \sin 2\psi$$

given on page 167 of the reference, is obtained by ignoring second harmonic effects $2\psi$ and adding pitch angle due to blade twist $\chi$.

Blade angle of attack $\alpha$:

$$\alpha = \theta + \phi \quad (\text{FIG. 2})$$

and $$\phi = \arctan \frac{U_p}{U_T}$$

since $U_P$ is small compared with $U_T$, at a blade tip, it is permissible to assume that $\tan \phi = \phi$, then $$\phi = \frac{U_p}{U_T}$$

where:

$U_p$=blade element normal velocity, and
$U_T$=blade element tangential velocity At a blade tip $$U_p = W_h + W_i + (p \sin \psi + q \cos \psi)R + \dot{\beta}R - \beta(U_h \cos \psi - V_h \sin \psi) \qquad (3)$$

and $$U_T = \Omega R + U_h \sin \psi + V_h \cos \psi - \dot{\gamma}_y \qquad (4)$$

where:

$U_h$, $V_h$ and $W_h$ are rotor hub velocities along aircraft X, Y, Z axes respectively,
$p$, $q$ and $r$ are aircraft angular velocities of roll, pitch and yaw respectively,
$W_i$ is the rotor induced airflow velocity by which lift is produced by the rotor blades,
$\beta$ and $\gamma$ are blade flapping and lagging angles respectively,
$\Omega$ is the rotational speed of the rotor in radians per sec.

At the retreating blade tip, $\psi=3\pi/2$ radians, therefore $$U_p = W_h + W_i - p.R \qquad (5)$$

and $$U_T = \Omega R - U_h \qquad (6)$$

Dividing by $\Omega R$ in Equation 5

$$\frac{U_p}{\Omega R} = \frac{W_h + W_i}{\Omega R} - \frac{pR}{\Omega R}$$

$$= \lambda_D - \frac{p}{\Omega} \qquad (7)$$

since $$\frac{W_h + W_i}{\Omega R}$$

is the rotor disc inflow ratio $\gamma_D$.

Dividing by $\Omega R$ in Equation 6

$$\frac{U_T}{\Omega R} = 1 - \frac{U_h}{\Omega R}$$

$$= 1 - \bar{\mu}_x \qquad (8)$$

Since $U_h/\Omega R$ is the hub forward velocity ratio $\bar{\mu}_x$ therefore $$\frac{U_p}{U_T} = \frac{\lambda_D - \frac{p}{\Omega}}{1 - \mu_x} \qquad (9)$$

The derivatives of Equations 3 and 4 is given in N.A.C.A. Report No. 487, dated 1934, entitled "An Aerodynamic Analysis of the Autogyro Rotor with Comparison Between Calculated and Experimental Results" by John B. Wheatley.

In Equation 7.2 of the report $$U_p = \lambda \Omega R - r \frac{d\beta}{dt} - \mu \Omega R \beta \cos \psi$$

This is a simplified form of Equation 3.

If, in Equation 3, the aircraft angular velocities $p$ and $q$ are put equal to zero and the rotor hub side velocity $V_h$ is put equal to zero then $$U_p = W_h + W_i + \dot{\beta}R - \beta U_h \cos \psi$$

Now $$\lambda = \frac{W_h + W_i}{\Omega R} \text{ by definition, } \mu = \frac{U_h}{\Omega R}, \dot{\beta} = \frac{d\beta}{dt}, r = -R$$

then $$U_p = \lambda \Omega R - r \frac{d\beta}{dt} - \mu \Omega R \beta \cos \psi$$

as in Equation 7.2.

In Equation 7.1 of the Report $$U_T = \Omega R + \mu \Omega R \sin \psi$$

This is a simplified form of Equation 4.

If, in Equation 4, the rotor hub side velocity $V_h$ is put equal to zero and lag motion velocity is ignored, then $$U_T = \Omega R + U_h \sin \psi$$

Now $$\mu = \frac{U_h}{\Omega R}$$

then $$U_T = \Omega R + \mu \Omega R \sin \psi$$

as in Equation 7.1.

The plane in which the blade tip moves is called the "tip path plane." The area swept by the rotor blades is termed the "rotor disc" and it is normally assumed that the disc is a circle of diameter equal to the unconed rotor span. The axis of the rotor disc is termed the disc axis $Z_D$. The disc plane contains the $X_D$ and $Y_D$ axes, $X_D$ is directed towards the helicopter nose and $Y_D$ to the right.

What I claim is:

1. Ground-based aircraft flight simulating apparatus for simulating helicopter flight comprising:
   a pilot's compartment provided with controls and instruments representative of the controls and instruments of the simulated helicopter,
   a computer for actuating the instruments so as to indicate simulated conditions of flight and engine operation as determined by operation of the controls, and
   an instructor's console from which the computed conditions are controlled,
   a position servo means comprising a servo amplifier, a motor, a speed reduction gear having an output shaft and a plurality of potentiometers, said potentiometers having wipers which are coupled to the output shaft of said speed reduction gear, wherein said position servo means computes the blade angle of attack of an element of a rotor blade of said helicopter, at one azimuth angle of the rotor disc, from electrical signals, from said computer, representing blade pitch angle and normal and tangential airflow velocities with respect to the blade at said azimuth angle; and wherein at least one output from said position servo means which is a function of the computed blade angle of attack is fed through said position servo means to said pilot's compartment, whereby effects due to stalling of the blades of the main rotor of a helicopter may be simulated.

2. In a ground-based aircraft flight simulating apparatus for simulating helicopter flight comprising: a pilot's compartment provided with controls and instruments representative of the controls and instruments of the simulated helicopter, a computer for actuating the instruments so as to indicate simulated conditions of flight and engine operation as determined by operation of the controls, and an instructor's console from which the computed conditions are controlled; the improvement comprising computing means for computing blade angle of attack of an element of a rotor blade of a helicopter, at one azimuth angle of the rotor disc, from electrical signals from the computer representing blade pitch angle and normal and tangential airflow velocities with respect to the blade at said azimuth angle and means for providing at least one output from the said computing means which is a function of the computed blade angle of attack, wherein blade pitch angle is computed according to an expression of the form:

$$A_{OD} - A_{ID} \cos \psi - B_{ID} \sin \psi + \chi$$

blade angle of attack is computed according to an expression of the form:

$$\theta + \phi, \text{ and}$$

the said azimuth angle is $N\pi/2$, N being an odd integer, wherein:

$A_{OD}$ is blade collective pitch angle measured with respect to rotor disc plane;

$A_{ID}$ is longitudinal amplitude of cyclic pitch angle, measured with respect to rotor disc plane axis $Y_D$;

$B_{ID}$ is lateral amplitude of cyclic pitch angle, measured with respect to rotor disc plane axis $X_D$;

$\chi$ is pitch angle due to blade twist;

$\psi$ is blade azimuth angle, $\theta$ is the blade pitch angle;

$\phi$ is the $$\text{arc tan } \frac{U_P}{U_T}$$

where $U_P$ is the blade element normal velocity and is expressed in the form:

$$W_h + W_i + (p \sin \psi + q \sin \psi)R + \beta R - \beta(U_h \cos \psi - V_h \sin \psi)$$

and $U_T$ is the blade element tangential velocity and is expressed in the form:

$$\Omega R + U_h \sin \psi + V_h \cos \psi - \gamma y$$

where $U_h$, $V_h$ and $W_h$ are rotor hub velocities along the aircraft X, Y, and Z axes, respectively, $p$, $q$ and $r$ are aircraft angular velocities of roll, pitch and yaw, respectively, $W_i$ is rotor induced velocity, $\beta$ and $\gamma$ are blade flapping and lagging angles, respectively, and $\Omega$ is the rotational speed of the rotor in radians per second.

3. Ground-based aircraft flight simulating apparatus, as claimed in claim 2, in which the value of the term $U_p/U_T$ is computed according to an expression of the form:

$$\frac{\lambda_D - \frac{p}{\Omega}}{1 - \bar{\mu}_x}$$

where $\lambda_D$ is the rotor disc inflow ratio; and $\bar{\mu}_x$ is the hub forward velocity ratio.

4. Ground-based aircraft flight simulating apparatus, as claimed in claim 3, in which the expression:

$$\frac{\lambda_D - \frac{v}{\Omega}}{1 - \bar{\mu}_x}$$

is computed at the output of a first summing amplifier having three inputs applied each to a summing resistor, the first input being an input representative of $\lambda_D$, the second being derived from the wiper of a potentiometer supplied with an input representative of $-p$ and controlled by a servo shaft positioned according to $\Omega$, and the third being derived from the wiper of a potentiometer supplied from the output of the said first summing amplifier and controlled by a servo shaft positioned according to $\bar{\mu}_x$.

5. Ground-based aircraft flight simulating apparatus, as claimed in claim 4, in which the computed blade angle of attack is provided as a shaft displacement, said shaft being controlled by a servo motor, by way of a speed reduction gearing, said servo motor being controlled by the output of a second summing amplifier having at least four inputs applied each to a summing resistor, the first being an input representative of $A_{OD}$, the second being an input representative of $B_{ID}$, the third being an input representative of $\chi$ and the fourth being the output of said first summing amplifier.

6. Ground-based aircraft flight simulating apparatus, as claimed in claim 5, in which said second summing amplifier has a fifth input representative of the said shaft displacement.

7. Ground-based aircraft flight simulating apparatus as claimed in claim 6, in which said shaft displacement controls one or more potentiometers, having parts of their windings shorted out, to provide signals, for values in excess of a critical shaft displacement, providing signals representative of one or more of the following characteristics of blade stalling:

frequency of passage of rotor blade tips past a fixed point on the periphery of the rotor disc;

additional rolling and pitching signals;

reduction of rotor lift; and rotor drag and rotor torque coefficients.

8. Ground-based aircraft flight simulating apparatus as claimed in claim 7, in which the shorted-out proportion of the said potentiometer windings is predetermined according to the blade stalling characteristics of a particular aircraft simulated.

References Cited

UNITED STATES PATENTS

| | | | |
|---|---|---|---|
| 3,004,351 | 11/1961 | Hunt et al. | 35—12 |
| 3,078,595 | 2/1963 | Dawson et al. | 35—12 |
| 3,220,121 | 11/1965 | Cutler | 35—12 |

FOREIGN PATENTS

| | | |
|---|---|---|
| 597,233 | 5/1960 | Canada. |

EUGENE R. CAPOZIO, *Primary Examiner.*